United States Patent [19]
Lubbers et al.

[11] Patent Number: 5,933,592
[45] Date of Patent: *Aug. 3, 1999

[54] PROMOTING DEVICE LEVEL ERROR TO RAIDSET LEVEL ERROR TO RESTORE REDUNDACY IN A RAID ARRAY DATA STORAGE SYSTEM

[75] Inventors: Clark E. Lubbers, Colorado Springs; Stephen J. Sicola, Monument; Ronald H. McLean, Elbert; James Perry Jackson, Colorado Springs; Robert A. Ellis, Woodland Park, all of Colo.

[73] Assignee: Digital Equipment Corporation, Maynard, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 08/542,933

[22] Filed: Oct. 13, 1995

[51] Int. Cl.⁶ .............................. G06F 11/00; G06F 12/12
[52] U.S. Cl. .............................. 395/182.04; 395/182.01; 395/182.06; 711/114; 711/133
[58] Field of Search ........................ 395/182.04, 182.01, 395/441, 182.05, 182.06; 371/10.2, 40.1, 40.4, 49.1, 51.1, 40.11; 364/268, 268.3, 269.2; 711/114, 133, 159

[56] References Cited

U.S. PATENT DOCUMENTS

| | | | |
|---|---|---|---|
| 4,434,487 | 2/1984 | Rubinson et al. | 371/10 |
| 4,775,978 | 10/1988 | Hartness | 371/38 |
| 5,208,813 | 5/1993 | Stallmo | 371/10.1 |
| 5,233,618 | 8/1993 | Glider et al. | 371/68.1 |
| 5,235,601 | 8/1993 | Stallmo et al. | 371/40.1 |
| 5,253,256 | 10/1993 | Oyama et al. | 371/40.1 |
| 5,301,297 | 4/1994 | Menon et al. | 395/425 |
| 5,331,646 | 7/1994 | Krueger et al. | 371/40.1 |
| 5,379,411 | 1/1995 | Morgan et al. | 395/575 |
| 5,390,187 | 2/1995 | Stallmo | 371/10.1 |
| 5,390,327 | 2/1995 | Lubbers et al. | 395/575 |
| 5,469,453 | 11/1995 | Glider et al. | 371/68.1 |
| 5,488,701 | 1/1996 | Brady et al. | 395/182.04 |
| 5,490,248 | 2/1996 | Dan et al. | 395/182.04 |
| 5,504,858 | 4/1996 | Ellis et al. | 395/182.04 |
| 5,522,031 | 5/1996 | Ellis et al. | 395/182.04 |
| 5,522,032 | 5/1996 | Franaszek et al. | 395/182.04 |
| 5,826,001 | 10/1998 | Lubbers et al. | 395/182.04 |

*Primary Examiner*—Dieu-Minh T. Le
*Attorney, Agent, or Firm*—Hamilton, Brook, Smith & Reynolds, P.C.

[57] ABSTRACT

A RAID array includes redundant storage devices. Data is distributed across the storage devices, and organized as slivers of RAID protected data blocks. This redundancy provides for the reconstruction of valid data when data at a particular data block of a sliver is found to be inconsistent. However, when more than one data block of a sliver is found to have inconsistent data, reconstruction of the inconsistent data blocks may not be possible. Nonetheless, data consistency can still be restored to that sliver. Consistency is restored to such a sliver by replacing any inconsistent data in a data block with predetermined data and reconstructing the parity data block using the predetermined data. Other data in the RAID array keeps track of those data blocks with the predetermined data to indicate that such blocks do not contain valid data.

8 Claims, 9 Drawing Sheets

PROMOTING DEVICE LEVEL ERROR TO RAIDSET LEVEL ERROR TO RESTORE REDUNDACY IN A RAID ARRAY DATA STORAGE SYSTEM

BACKGROUND OF THE INVENTION

1. Field of the Invention

This invention relates to a RAID array, data storage system having a storage format that includes device metadata on each storage device in the array and RAID protected RAIDset metadata distributed across the storage devices in the RAID array. More particularly, the invention relates to promoting a device-level error as represented by device metadata to a RAIDset-level error as represented by RAIDset metadata in order to restore redundancy.

2. Description of Related Art

In data processing systems, there has been and continues to be an ongoing evolution in increasing the reliability of user data stored on data storage subsystems used by the data processing system. For some time, Digital Equipment Corporation has provided on each of the SCSI disk drives in its storage subsystems a flag bit for each block of data recorded on the disk drive. This flag bit is named the forced error bit or FE bit. Each user data block on the drive has a corresponding FE bit stored on the disk drive. If the FE bit is set to one, it indicates the user data in the block associated with the FE bit is not trustworthy. In other words, the data can be read but, for whatever reason, the data is corrupt and can not be trusted. U.S. Pat. No. 4,434,487 illustrates techniques for generating the FE bit and using the FE bit.

Another technique for adding to the reliability of stored user data is the distribution of user data across multiple storage devices in a RAID array of storage devices. The purpose of a RAID array is to provide redundancy so that user data may be regenerated when individual blocks of data are bad or lost. For example, in a RAID array having five storage devices or members, user data is recorded in four blocks, each of these four blocks is recorded on a separate storage device, i.e. disk drive. In addition, a fifth drive or member is added to the RAID array in order to store a parity block for the other four blocks. The four user data blocks and their parity block are said to form a sliver in the RAID array. A complete description of the RAID disk array technology may be found in *The RAID Book, a Source Book for Disk Array Technology*, Fourth Edition, edited by Paul Massiglia and published by the RAID Advisory Board, St. Peter, Minn., Sep. 1, 1994, copyright 1994 RAID Advisory Board, Incorporated.

The parity block in a sliver of blocks is created by exclusive ORing the user data blocks in the sliver. The nth bit of the parity block is the exclusive OR (XOR) of the nth bit of each data block in the sliver. If any one of the user data blocks or the parity block is bad, the bad block may be reconstructed by bitwise XORing the remaining blocks in the sliver. When the parity block contains the bitwise XOR of the data blocks in the sliver than the sliver is said to be consistent. Consistency in a RAID array is typically tracked by storing in the controller an indication of which slivers in the RAID array have consistent data blocks.

To date, it has not been possible to restore redundancy when two or more data blocks in a sliver of blocks on the RAID array have bad or lost data.

SUMMARY OF THE INVENTION

It is an object of this invention to restore redundancy to slivers of the RAID array which have more than one bad data block.

It is another object of this invention to restore redundancy across a sliver in the RAID array, when data cannot be regenerated and still be able to report that data is lost.

In accordance with this invention, consistency in multiple data blocks in a RAID array is restored under the control of metadata recorded in the RAID array. The RAID array has a plurality of members, each member being a storage device. The metadata includes device metadata for data blocks recorded on each member and RAIDset metadata for RAID protected data blocks recorded across the members of the RAID array. The RAID protected data blocks include user data blocks, metadata data blocks and parity data blocks. Consistency is restored in the multiple data blocks by marking each inconsistent block in a RAID protected sliver of blocks. An inconsistent block contains data inconsistent with RAID protection of other blocks in the RAID protected sliver. When a plurality of blocks marked inconsistent in the RAID protected sliver of blocks are detected, each of the inconsistent blocks is written with predetermined data to provide predetermined-data blocks in place of the inconsistent blocks. The parity data block in the RAID protected sliver is reconstructed based on the predetermined-data blocks and consistent data in other blocks of the RAID protected sliver. The device FE bits corresponding to said predetermined-data blocks and said parity data block are cleared to indicate all blocks in the RAID protected sliver are now consistent.

In another feature of the invention, the RAIDset metadata for the predetermined-data blocks is set to a state to indicate the data in the predetermined data block is not valid.

The foregoing and other objects, features and advantages of the invention will be apparent from the following more particular description of a preferred embodiment of the invention as illustrated in the accompany drawings.

DETAILED DESCRIPTION

Figure 1:
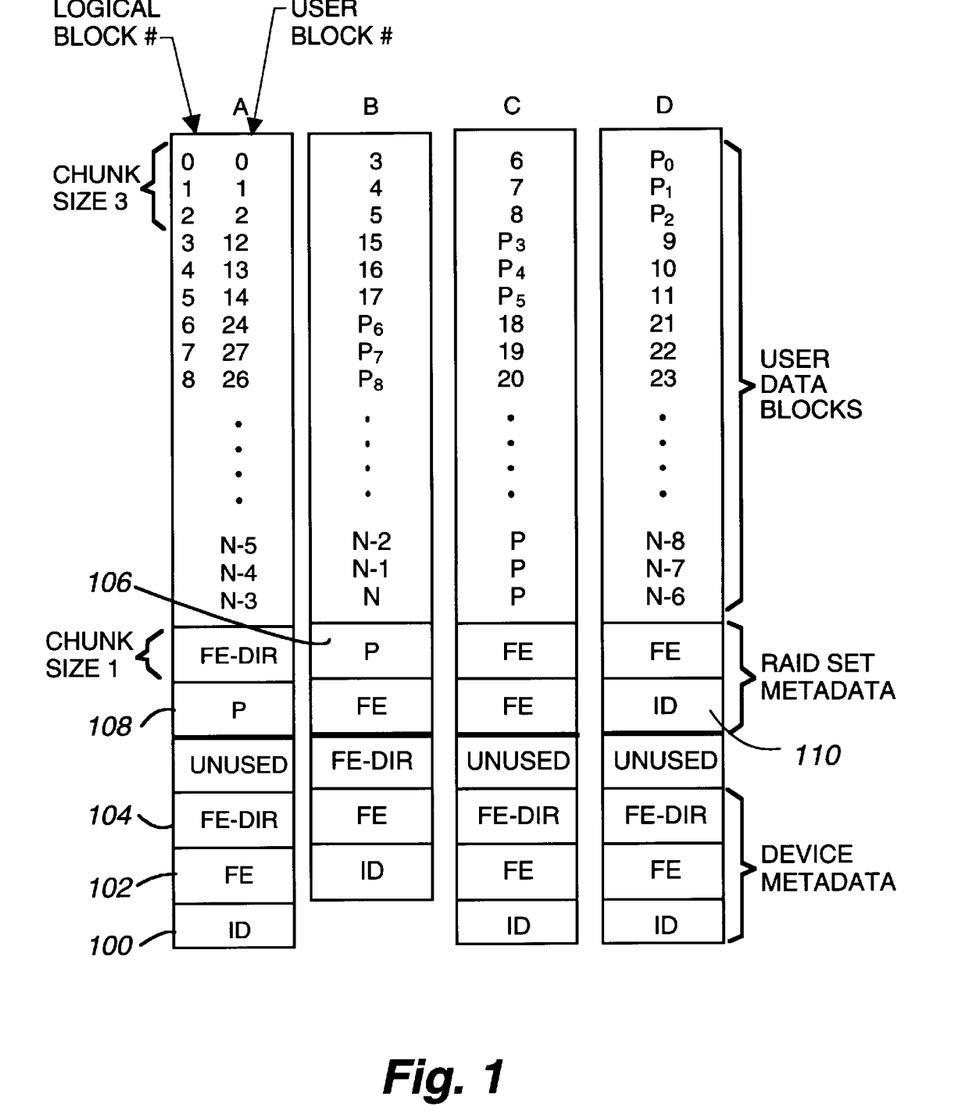
FIG. 1 shows a four disk RAID array with RAIDset metadata and device metadata.

In FIG. 1, the physical locations of RAIDed (or RAID protected) user data, RAIDed metadata and device metadata are illustrated in accordance with a preferred embodiment of the invention. In the simple example of FIG. 1, the RAID array includes four disk drives, drives A, B, C, and D. As indicated in FIG. 1, the storage capacity of the drives is split between user data blocks, RAIDset metadata, and device metadata.

Drives A, B, C, and D need not be of the same size. If they are not the same size as depicted in FIG. 1, there is unused storage space in the larger drives. This unused space is located after the RAIDset metadata and before the device metadata.

Both the user data blocks and the RAIDset metadata are RAID protected data. As indicated for the user data blocks, three data blocks, one from each of the disk drives is associated with a parity block in the fourth disk drive. The parity block is written based on the exclusive OR summation of its associated user data blocks. For example, parity block P1 is the result of exclusive ORing user block 1 with user block 4 and exclusive ORing the result of that operation with user block 7. In Boolean notation, this is represented by P1=1⊕4⊕7.

The user data blocks are accessed in chunk sizes of three blocks. For example, user blocks 12, 13 and 14 are read from disk drive A, while user blocks 15, 16, and 17 are read from drive B and blocks 9, 10, and 11 are read from drive D. At the same time, parity blocks P3, P4, and P5 are read from drive C. User blocks 9, 12 and 15 with parity block P3 constitute a sliver and are said to be RAID protected or RAIDed.

With regard to the metadata, the device metadata is recorded in the last few logical blocks of each device, i.e. disk drive. The last block in the device metadata is the ID block. In drive A, for example, the device metadata identifies the disk drive, the RAID array, the disk drive members of the RAID array (in this case drives A, B, C, and D) and other operative information regarding the disk drive A. In the data space just preceding the ID block in drive A, device FE bits for the logical blocks in drive A are written.

Logical blocks are numbered by disk drive. In drive A, the user data blocks are 0, 1, 2, 12, 13, 14, 24, 25, 26, etc. The same blocks are the drive "A" logical blocks numbered 0–8. Accordingly, user data block 14 in the RAIDset would be logical block 5 in drive A. Similarly, although not indicated in FIG. 1, user data block 17 in the RAIDset would correspond to logical block 5 in drive B.

The device FE bits recorded in space 102 of drive A indicate the useability of logical blocks in drive A to reconstruct data in a bad block in the same RAIDed sliver. In other words, each device FE bit indicates the redundancy or consistency of its corresponding data block relative to other data blocks in the same sliver of the RAID array. If a device FE bit is set to "1," the corresponding logical block data is said to be non-redundant or inconsistent. This means that data in the block cannot be used with the other blocks of data in the RAID sliver to reconstruct data in one of the other blocks. If the device FE bit is "0," the corresponding logical block is said to be clear. In this case, the data in the logical block may be used to reconstruct data in other blocks in the same RAID sliver. For example, if the device FE bit for logical block 5 in drive A is set to 1, the user data in user block 14 is not redundant or is inconsistent. The user data in block 14 cannot be used to reconstruct data in user blocks 11 or 17 or parity block P5. If the device FE bit for logical block 5 is 0, then the data in logical block 5 or user block 14 is consistent and may be used to reconstruct data in one of the blocks 11, 17 or P5.

The Fe Dir bits in space 104 of drive A are used to provide a fast lookup of the condition of the FE bits in space 102. There is one Fe Dir bit in space 104 for each block of FE bits in space 102. An Fe Dir bit is set to 1 if any FE bit in its corresponding block in the FE space 102 is set to 1. Accordingly, an Fe Dir bit set to 0 indicates that all FE bits in its FE bit block are clear. Conversely, if an Fe Dir bit is set to 1, at least one of the FE bits in the corresponding FE bit block is set to 1.

Each of the disk drives B, C, and D contain corresponding information for their drive in corresponding ID blocks, device FE bit space and device Fe Dir bit space. This data is referred to as the device metadata.

The RAIDset metadata provides information about the RAIDed or RAID protected user data blocks in the entire virtual set of user data blocks. It is not limited to each drive as was the device metadata described immediately above. Virtual set refers to the user data blocks (but not the parity blocks) distributed across the drives A–D in the RAID array. In other words, in the example in FIG. 1, the virtual set consists of user data blocks O–N. To a host CPU using the RAID array a virtual set looks like a virtual disk drive having O–N data blocks.

The RAIDset metadata adds to this virtual drive the same metadata structure as used for the device metadata in the actual drives. In other words, the RAIDset metadata includes an ID block for the virtual set of data blocks, multiple blocks of FE bits, and an Fe Dir block. Further, the RAIDset metadata is included in the RAID protected region of the disk drives, and therefore parity blocks 106 and 108 are provided for RAID protection of the RAIDset metadata. The ID block 110 identifies the virtual set of blocks and the members (disk drives) of the RAIDset. The FE bit space contains an FE bit for each user block in the virtual set. Each FE bit is set to 1 to indicate that its corresponding user block contains data that is not trustworthy. In other words, if the FE bit for user block 25 is set to 1, then user block 25 in disk drive A may be read, but the data is corrupted and may not be trusted. If the FE bit in the RAIDset metadata is set to 0, then the corresponding user block contains true, or valid, data, i.e., data that may be trusted.

Just as with device metadata, the RAIDset metadata also has an Fe Dir block. In the Fe Dir block, each bit corresponds to a block of FE bits in the FE bit space. The Fe Dir bit is set to 1 to indicate that its corresponding FE bit block has at least one bit set to 1. If the Fe Dir bit in the RAIDset metadata is set to 0, then the corresponding FE bit block in the RAIDset metadata contains all zeros.

Figure 2:
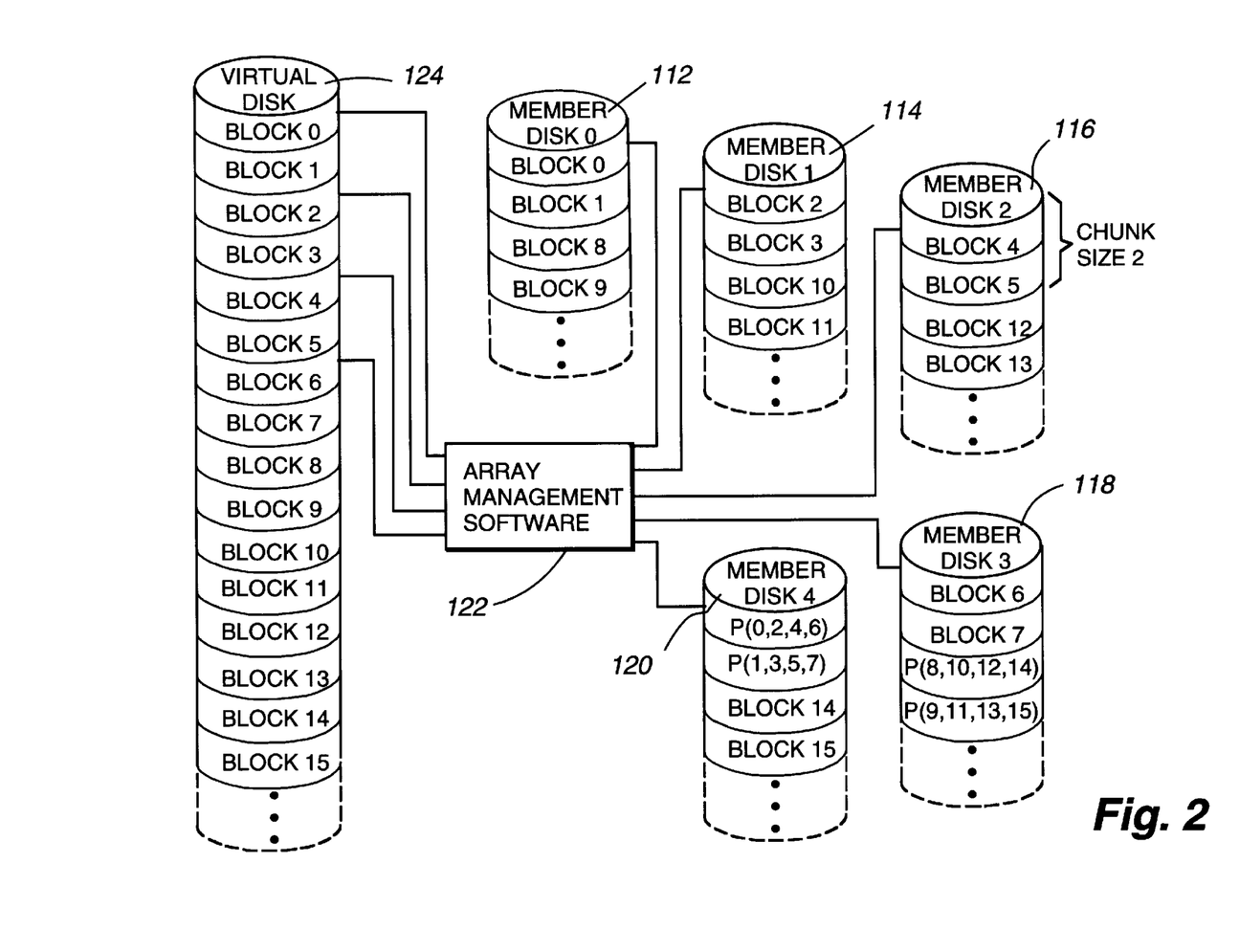
FIG. 2 illustrates the relationship between actual disk drives of a RAID array, RAID array management software and the virtual disk drive simulated by the RAID array.

In FIG. 2, a RAID level 5 relationship between actual member disk drives and the equivalent virtual disk drive is illustrated. There are five actual disk drives: 112, 114, 116, 118 and 120. The RAID array management software 122 manages the distributed user data blocks and parity blocks on drives 112, 114, 116, 118 and 120 so that as a virtual set the user data blocks appear as illustrated on virtual disk drive 124. The RAID system in FIG. 2 differs from that depicted in FIG. 1 in that there are five actual disk drives in FIG. 2, while there are four in FIG. 1. Also, the chunk size for the user data blocks is 3 blocks high in FIG. 1, while it is 2 blocks high in FIG. 2. The device metadata and RAIDset metadata are not shown in FIG. 2.

Figure 3:
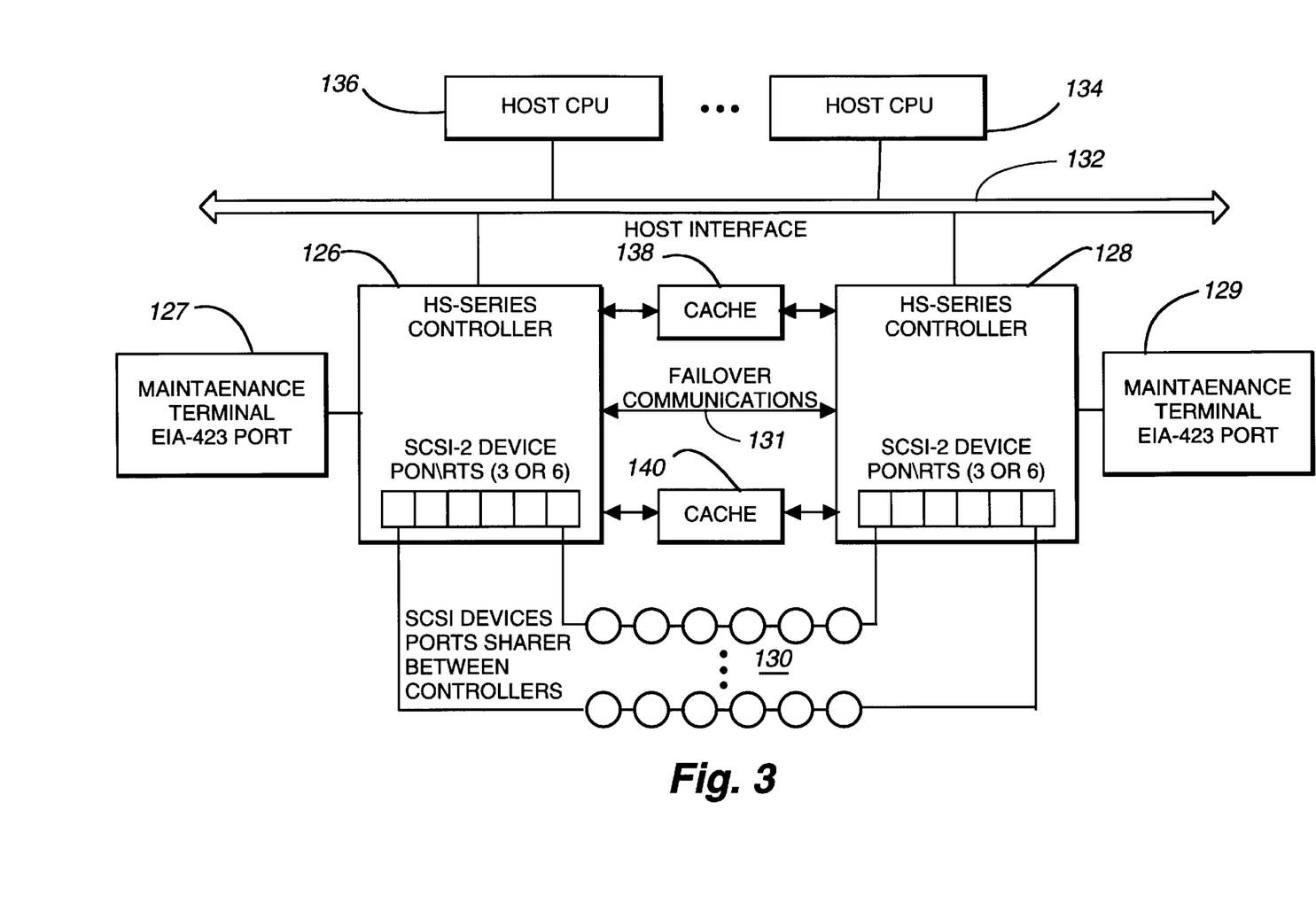
FIG. 3 illustrates a data processing system having redundant RAID array controllers for running RAID array management software for reconstructing data blocks in accordance with this invention.

The array management software runs on the controllers in the data processing system shown in FIG. 3. FIG. 3 illustrates a redundant controller RAID system connected to a host interface with a plurality of host CPUs. Array controller 126 and array controller 128 each are connected to up to six SCSI device busses 130. The members (disk drives) of the RAID array are connected to the busses. The controllers also connect to the host interface 132 and thereby to host CPUs 134 and 136. Controllers 126 and 128 also share cache memory 138 and 140.

Controllers 126 and 128 each include a processor with program storage and working storage for effectively creating the appearance of a virtual disk such as 124 in FIG. 2 from the actual disk drives connected to ports 130. The array management is transparent to host CPU 134 and host CPU 136. As to these host CPUs, it appears as if they have access to a virtual disk drive such as disk drive 124 in FIG. 2. The maintenance terminal ports 127 and 129 provide programmable and test access to the processors in the controllers 126 and 128 respectively. The failover communication link 131 provides communication for handoff control to one controller when the other controller fails. A more detailed discussion of RAID array controllers appears in the article entitled "The Architecture and Design of HS-Series Storage Works Array controllers" by Steven J. Sicola in the Digital Technical Journal, Vol. 6, No. 4, published by Digital Equipment Corporation. This article describing array controllers is incorporated by reference into this application.

The device FE Bits are used to control a repair process to regenerate bad blocks in the RAIDed (RAID protected) space of the members of the RAIDset. The repair process begins with operation 208 in FIG. 4. Operation 208 reads the device FE bits for the other blocks in the same sliver. This is done to detect whether any of the blocks whose data will be used to repair the bad block have been marked as inconsistent, i.e. unusable for RAID repair. Decision operation 210 tests for any other device FE bits set in the sliver and if none are detected, branches the repair process to operation 212. Operation 212 reads the data from each of the other blocks in the sliver, and operation 214 calculates the XOR (exclusive Or) of the blocks just read by operation 212. The result of the XOR calculation is the repaired or reconstructed block of data for the block corresponding to the device FE bit that was set to "1." Operation 216 writes the reconstructed block back to the storage device. After the block is reconstructed, step 218 clears the device FE bit (FIG. 7) to "0," and the repair process is complete.

Figure 4:
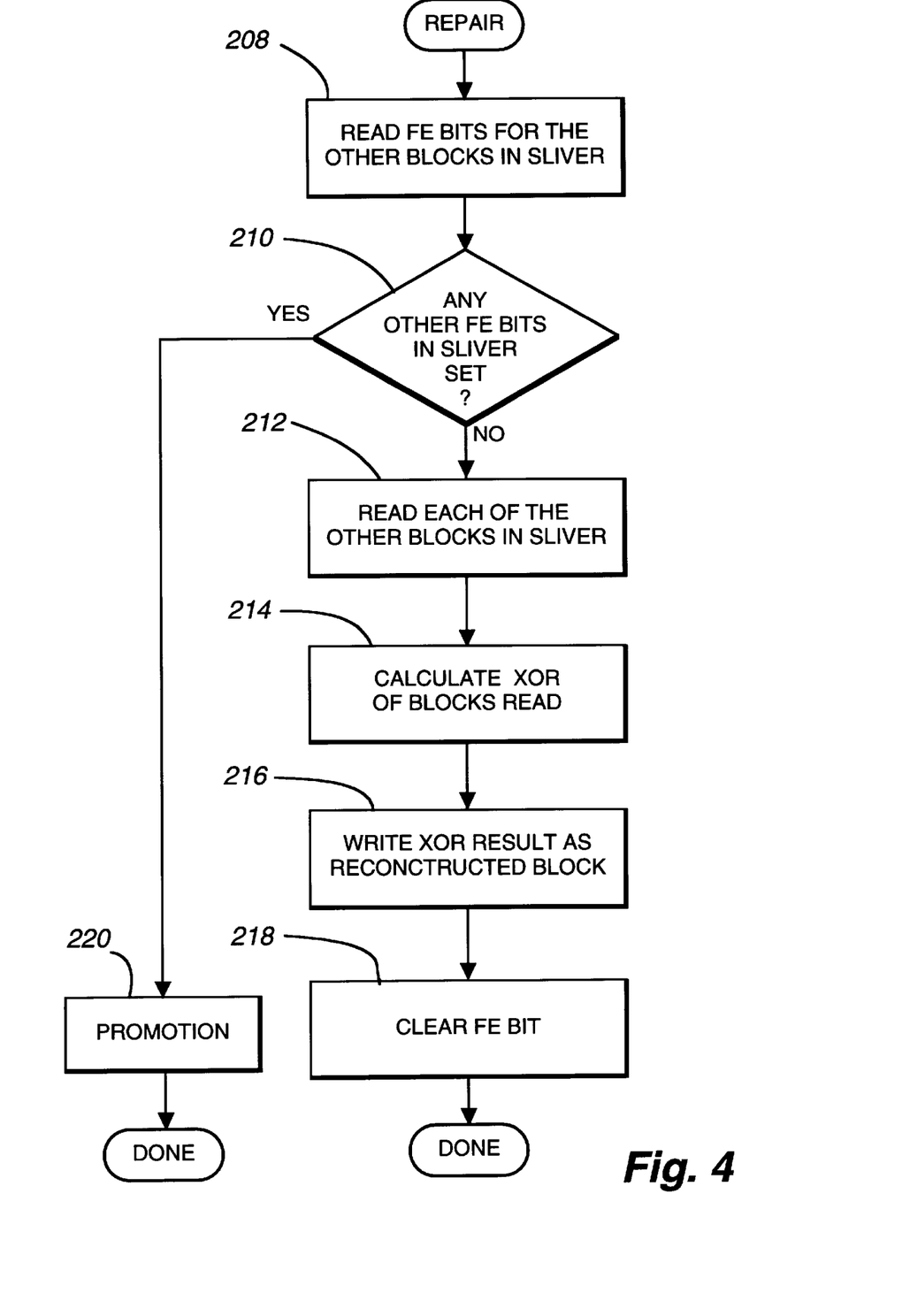
FIG. 4 shows a repair process which regenerates data blocks identified by device metadata.

If decision operation 210 detects that more than one block in the sliver has a device FE bit set, the repair process branches "Yes" to the promotion process 220. The promotion process restores redundancy but can not reconstruct a block if more than one block in a sliver is marked as inconsistent. After promotion, the repair process is again complete.

Figure 5:
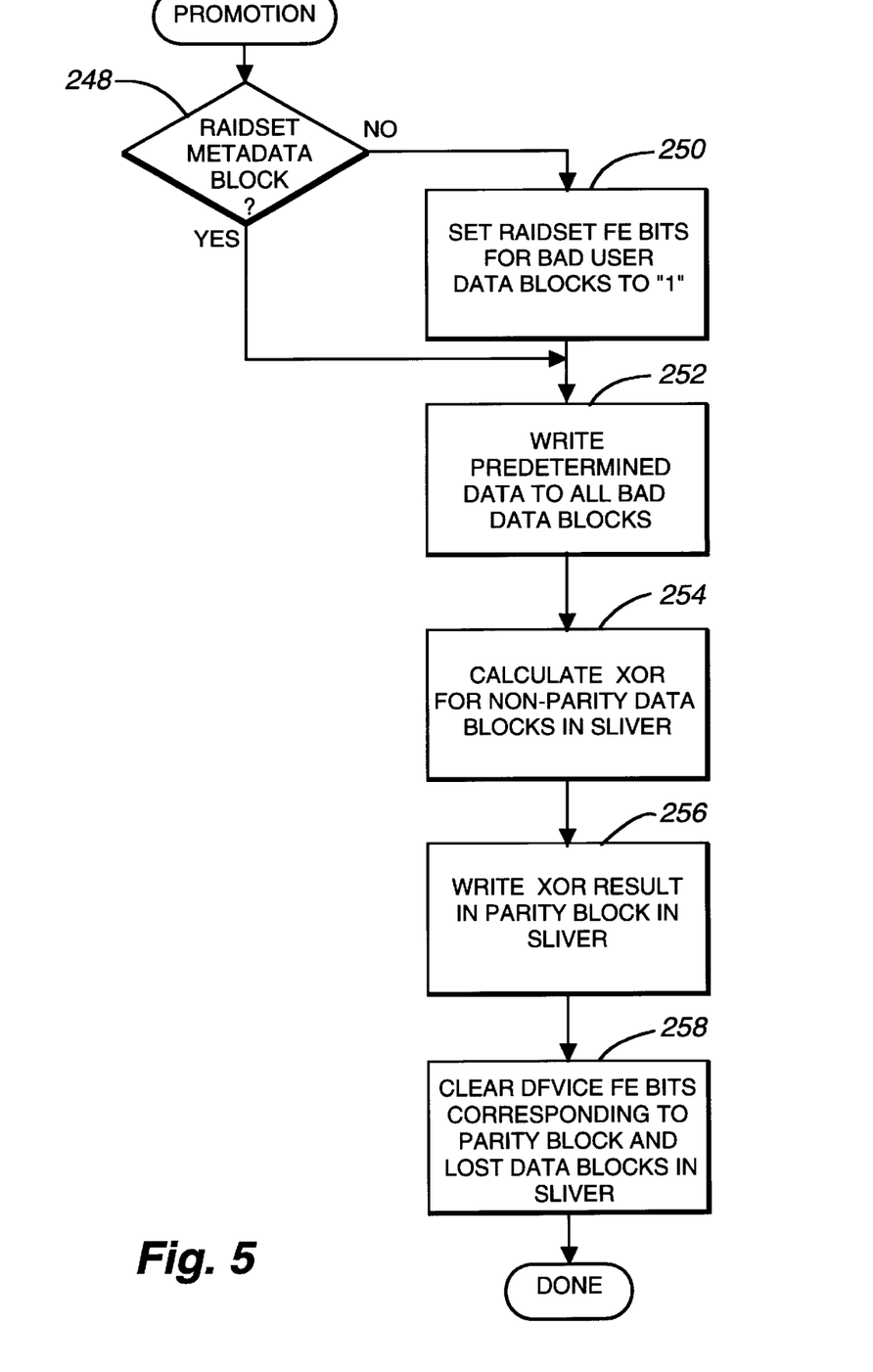
FIG. 5 shows the preferred embodiment of the invention implementing the logical operation flow of the promotion module in FIG. 4.

In FIG. 5 the promotion process starts at decision operation 248. Decision operation 248 tests whether the data blocks being regenerated are RAIDset metadata blocks or user data blocks. If the data blocks are user data blocks, the promotion process branches to operation 250 and then to operation 252. Operation 250 sets to "1" the RAIDset FE bit for each user data block identified as bad by the device FE bits. This will mark these blocks as untrustworthy. If the data blocks are RAIDset metadata blocks, the process branches directly to operation 252.

Operation 252 writes predetermined data to all bad data blocks. The predetermined data written to a bad data block depends on the type of data block as follows: user data block—all 0's, RAIDset FE Dir block—all 1's, RAIDset ID Block—duplicate ID (stored in RAIDset metadata), filler block (fill space in metadata space)—all 0's, RAIDset FE bit block if its FE Dir bit is 0—all 0's, and RAIDset FE Bit block if its FE Dir bit is 1—all 1's.

Operation 254 calculates the XOR of all non-parity data blocks in the sliver to regenerate the parity block for the sliver. The regenerated parity block is written to the storage device by operation 256. Operation 256 writes the XOR result from operation 254 to the parity block location in the storage device or member containing the parity block for the sliver. Then operation 258 clears device FE bits corresponding to the parity block and the lost, data blocks in the sliver. Now the sliver has been restored to consistency. The good user data or the good RAIDset metadata blocks may be reconstructed if they go bad thereafter. The lost user data blocks are usable to regenerate the good blocks in the sliver but have been flagged in the RAIDset metadata as containing untrustworthy data. If these lost user data blocks are sent to the host in a read operation, they will be marked with an error.

The reconstruct process has used both a "set FE Bit" process and a "clear FE Bit" process. Each of these processes also clear and set the corresponding FE Dir bit as appropriate.

Figure 6:
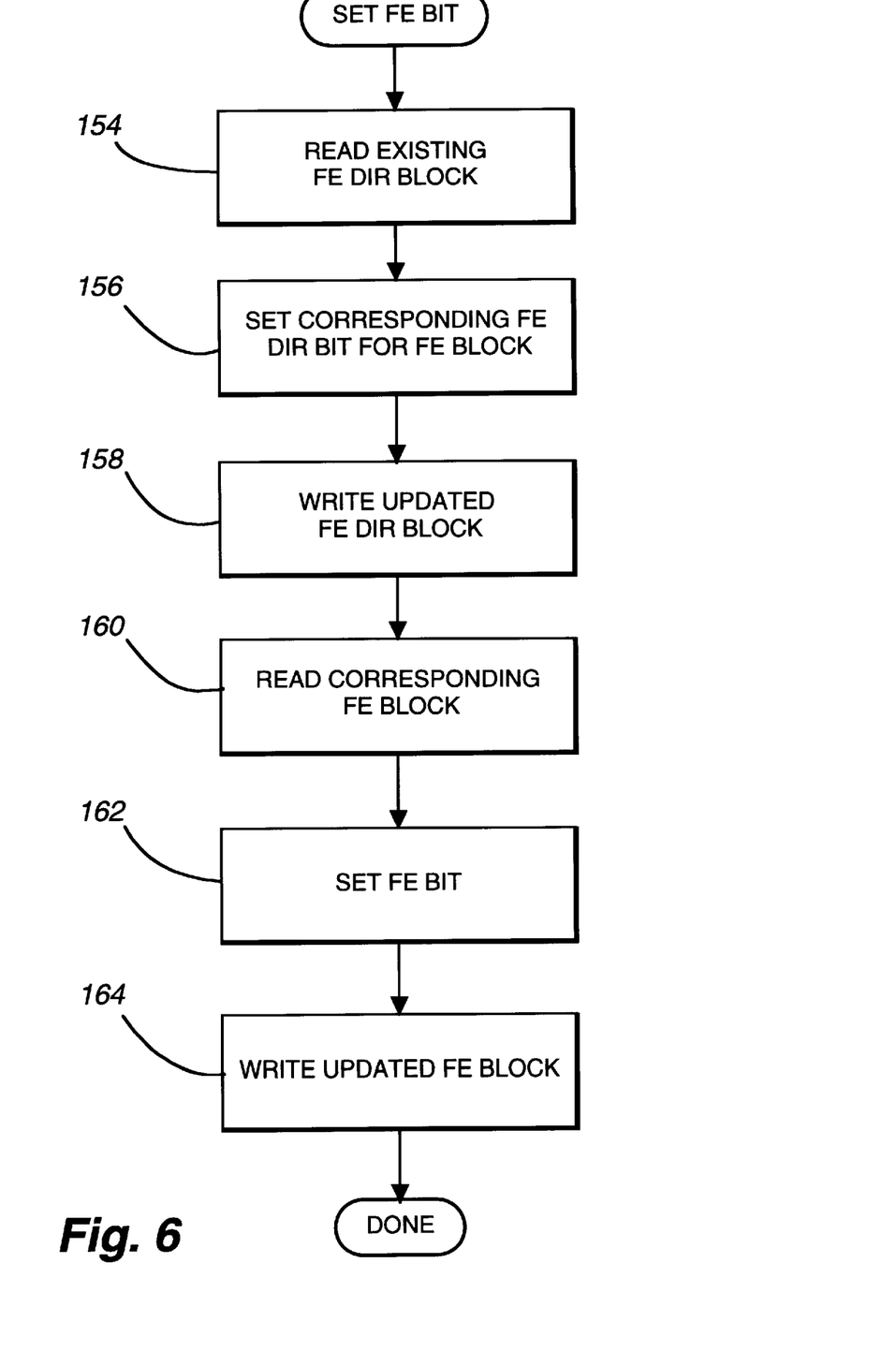
FIG. 6 shows the set FE Bit logical operation flow.

To set an FE bit to "1," the process in FIG. 6 begins with step 154 reading the existing FE Dir block containing the FE Dir bit corresponding to the FE bit block containing the FE bit that is being set. The FE Dir block is read from storage device to controller memory. After step 154 reads the FE Dir block into the controller memory space, operation 156 sets the FE Dir bit for the FE bit block to "1." Step 158 then writes the updated FE Dir block back to the storage device, i.e. disk drive.

The setting of an FE bit by first setting its corresponding FE Dir bit rather than first setting the FE Bit is a fail safe mode of operation. When checking for FE bits that have been set, the controller always checks the FE Dir bits first. This saves search time since an FE Dir bit represents a block of FE Bits. If the storage device were to go down between the setting of the FE Dir bit and the setting of the FE bit, the setting of the FE Dir bit would be a flag to the system that at least one of the FE bits in the corresponding FE block for the FE Dir bit may be set to "1."

Once the FE Dir bit has been set, step 160 reads the existing FE block from the storage device to controller memory space. Operation 162 then sets the FE bit in the FE block to "1." After the FE bit is set, operation 164 writes the updated FE block back to the storage device. This completes the "set FE bit" process.

Figure 7:
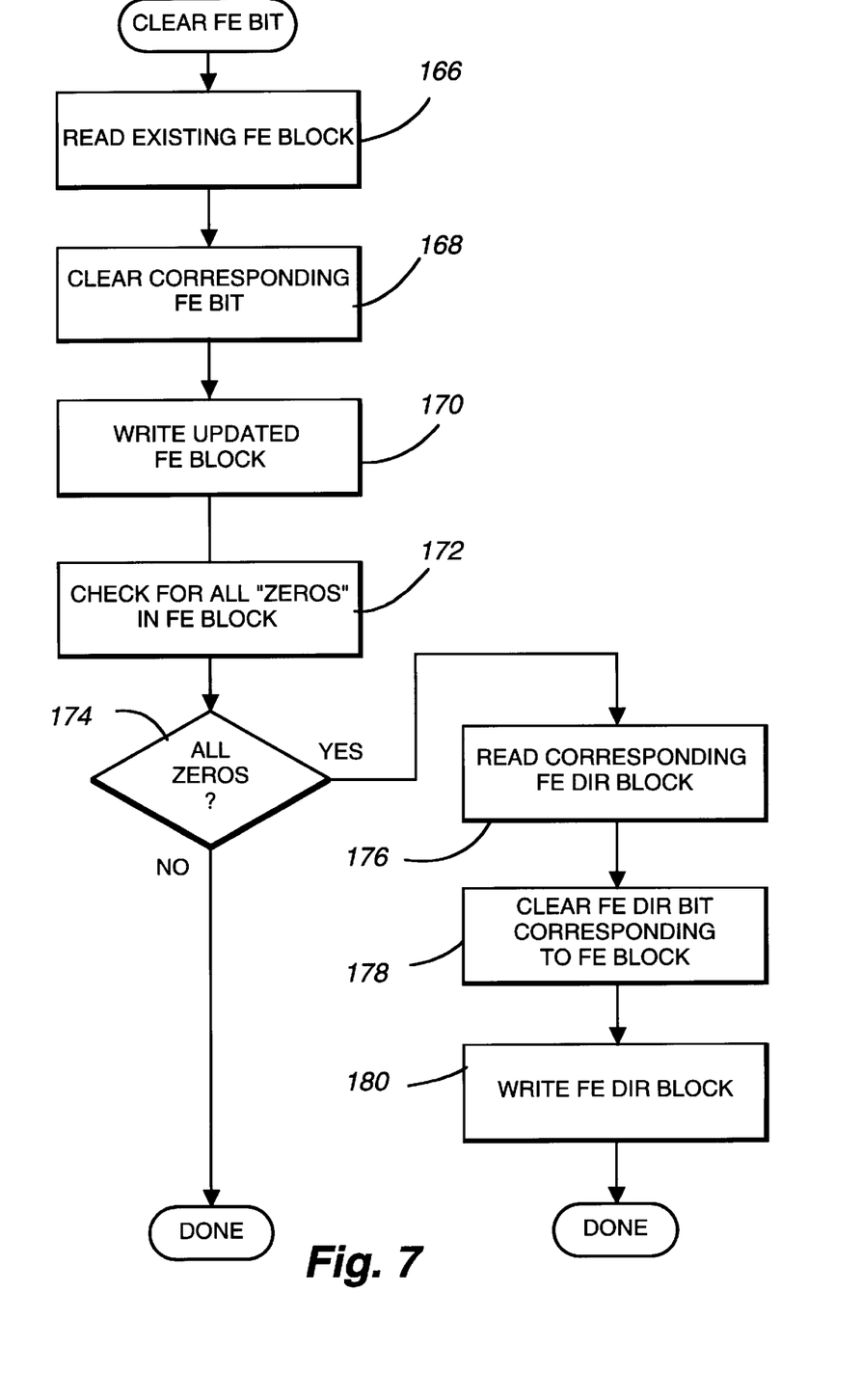
FIG. 7 shows the clear FE Bit logical operation flow.

To clear an FE bit to "0," the process in FIG. 7 begins with step 166 reading the existing FE block from the disk drive to the controller memory space. Operation 168 then clears the FE bit to "0" in memory space, and operation 170 writes the updated FE block back to the disk drive. Step 172 also reads the updated FE block from memory space to check if all the FE bits are "0." Decision operation 174 branches Yes, if the FE block is all clear, to operation 176. Step 176 reads the corresponding FE Dir block that contains the FE Dir bit for the FE block whose FE bit was changed. The FE Dir block is loaded into controller memory space, and step 178 clears the FE Dir bit for the FE block to "0." After the FE Dir bit is cleared, operation 180 writes the FE Dir block back to the disk drive.

In the "clear FE bit" operation the, FE bit is cleared first, and then the FE Dir bit is cleared. Again, this a fail safe mode operation in that the FE Dir bit is cleared last, because it is read first when the system is scanning for FE bits.

Promotion is also applied in cases where data is being written, parity must be regenerated by XORing all non-parity blocks not being written and all non-parity blocks being written (that is, all non-parity blocks), and one or more of the non-parity blocks not being written is bad and cannot be reconstructed (because some other block, which may be the parity block or one of the blocks being written, is bad). Consider the RAIDset depicted in FIG. 1 and specifically the sliver containing user blocks 1, 4, and 7 with parity block P1.

Suppose that user block 7 for the disk device C is being written and that disk device C is now inoperative. A RAIDset where one of the devices is inoperative (that is, missing) is said to be "reduced." Normally, in such a situation, the data from the other non-parity blocks in the sliver is XORed (in this case, user blocks 1 and 4) with the data that is being written (destined for user block 7 which would reside on disk device C which is now inoperative) and the parity block (P1) would be written. The data for user block 7 in such a case would exist only as the XOR of the other blocks in the sliver (the XOR of user blocks 1 and 4 and the parity block). That is, the data for user block 7 cannot be written to any media (because the media is not there) but can be recorded by modifying the corresponding parity block.

Now consider this same case of writing to the missing member of a reduced RAIDset where one of the non-parity blocks not being written is bad. Suppose in the above example that user data block 1 is bad. Either it was discovered bad during the read attempt or it was known to be bad because its device FE bit was set. Without this invention, an attempt to write the data for block 7 would require using this bad data which may, in fact, be variable due to instability of the data as recorded on the media. Since user block 7 cannot be written to any media and reliable parity cannot be generated, it is not possible to write user block 7 without some additional mechanism. The inventors have referred to this situation as a "black hole," because data written under these circumstances simply disappears. That is, it cannot be reliably reconstructed. The addition of promotion allows such data to be reliably written.

Figure 8:
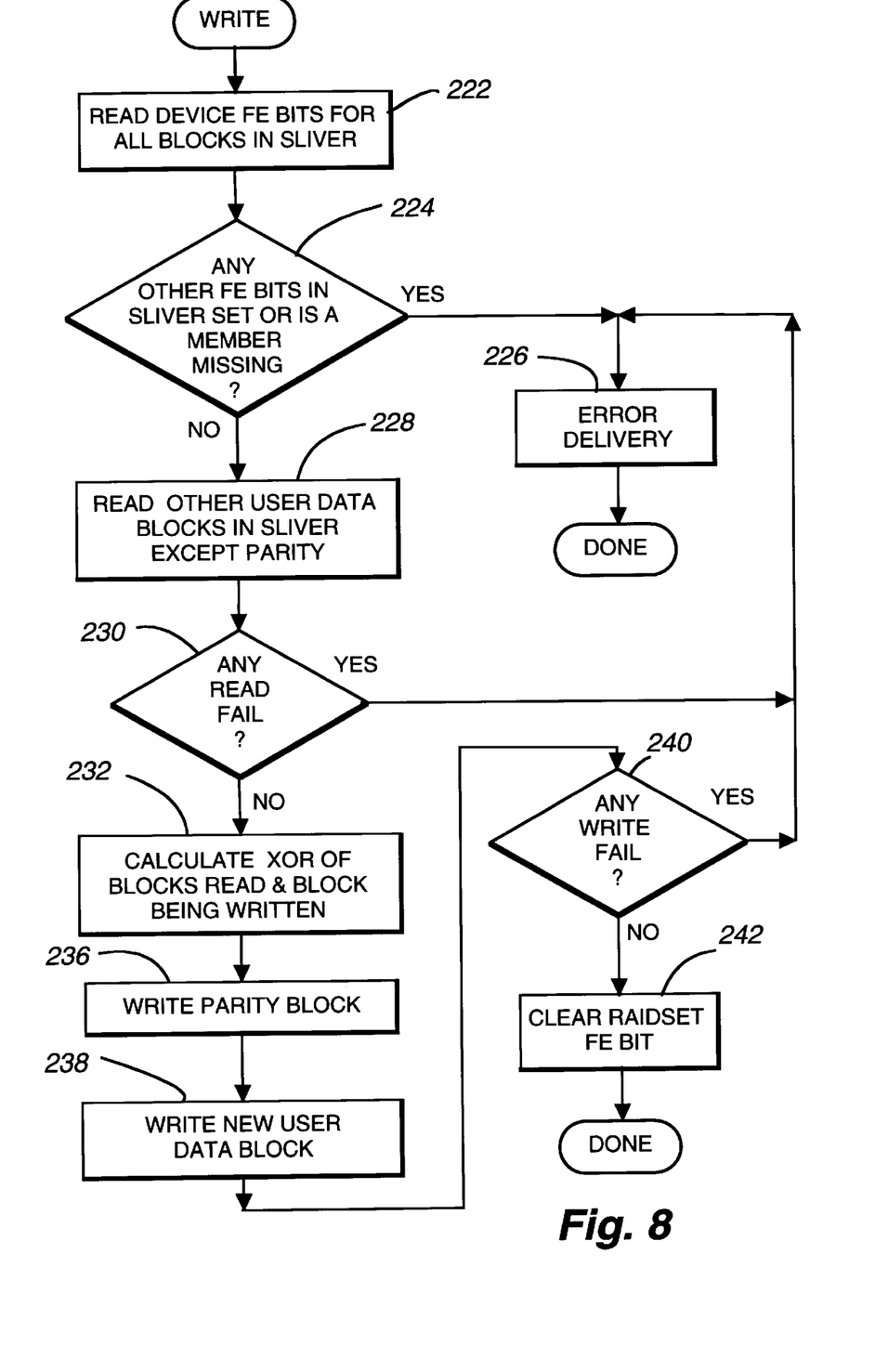
FIG. 8 shows a write operation using the device metadata and RAIDset metadata.
Figure 9:
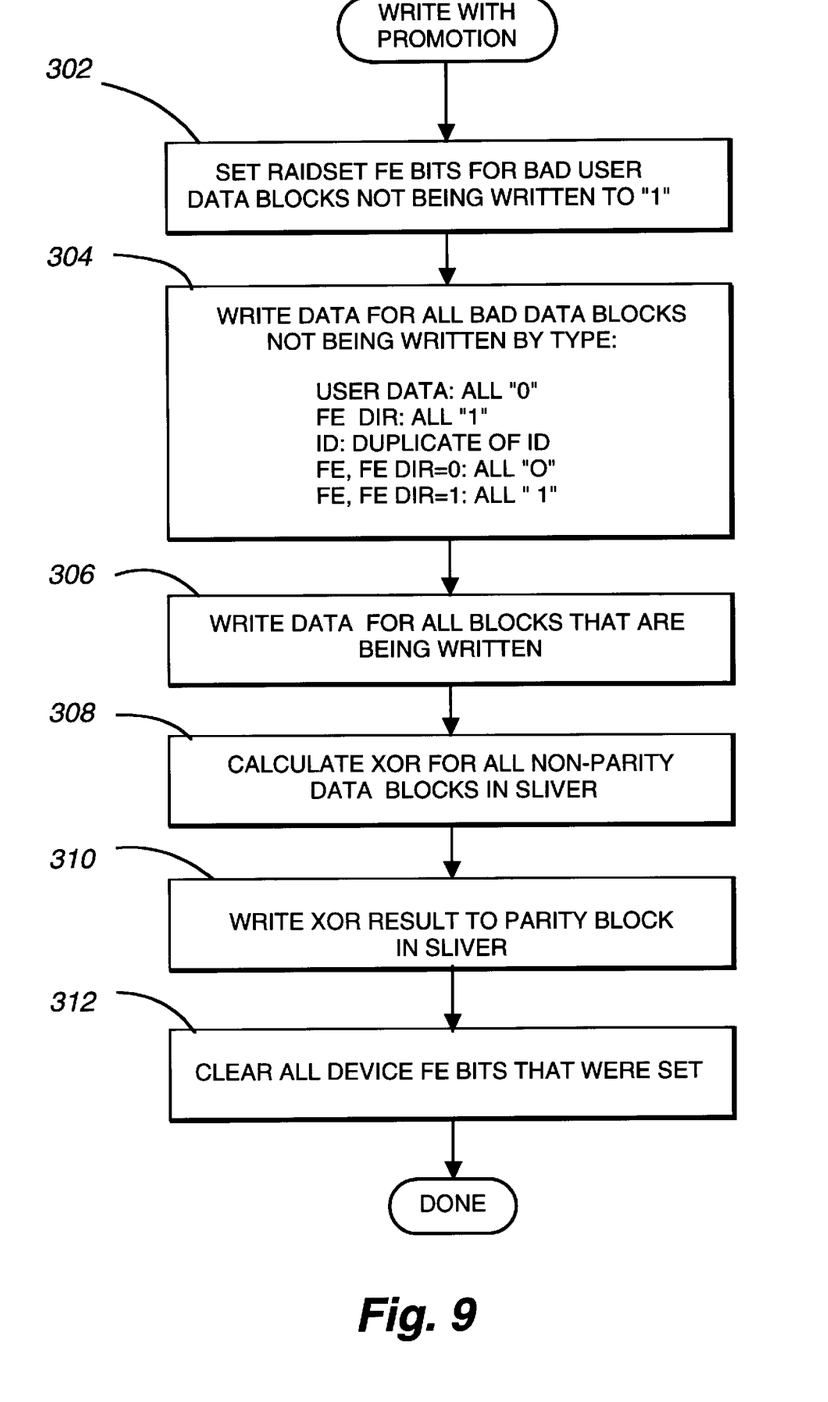
FIG. 9 shows the promotion process when promotion is invoked during a write operation.

The write operation is shown in FIG. 8 and the promotion operation for a write operation is illustrated in FIG. 9. In FIG. 8, operation 222 reads the device FE bits for the other blocks in the sliver. This is done to detect whether any of the blocks, whose data will be used to generate the parity block, have been marked as inconsistent. Decision operation 224 tests whether any other device FE bits corresponding to blocks in the sliver have been set and also detects if a member of the RAID array is missing, i.e. has crashed and needs replacement. If the answer is "Yes" to either condition, the process branches to the error recovery operation 226. Error recovery operation 226 includes the promotion process of FIG. 9 described hereinafter. If the answer is "No" to both conditions, operation 228 reads the data from each of the other user data blocks in the sliver but not the parity block.

Decision operation 230 tests whether any of the read operations performed by step 228 failed. If a read operation did fail in step 228, error recovery process is called. If the read operations were successful, operation 232 calculates the XOR (exclusive Or) of the data in the blocks just read by operation 228 and the data in the new block being written. The result of the XOR calculation is the updated parity block data. Step 234 writes the updated parity block for the sliver, and step 236 writes the new user data block in the sliver.

Decision operation 240 detects if either write operation 234 or 236 failed. If one or both of the write operations failed, the process branches to error recovery module 226. If the write operations were successful, step 242 clears the RAIDset FE bit to corresponding to the user data block just written to indicate the data in the block is valid.

In FIG. 9 promotion starts with operation 302 which sets all the RAIDset FE bits ("promotes the device FE bits") for bad user data blocks which are not being written. In the example above, this would consist of the RAIDset FE bit for user data block 1. Next in operation 304, bad data blocks not being written (for which, the user has not supplied new data to be written) are written instead with predetermined data (to clear their indeterminate state by supplying reliable data which may be used in an XOR calculation). For user data blocks, all zero data is written although it is permissible to simply rewrite that data supplied by the drive during a read attempt, such data being referred to as the "best guess data." In cases involving metadata, a specific data pattern based on the type of metadata which should reside on the data block is written as depicted in the block labeled 304. In the specific example above, all zeros would be written to user data block 1.

At this point, all non-parity data blocks for which the user has not supplied new data to be written contain reliable data and are said to be consistent. In operation 306, the non-parity blocks for which new data to be written has been supplied by the user are written. In the case, of a write to a missing drive, the write for that particular drive is simply bypassed (treated as a so-called "no-op"). However, this new data is resident in memory and available for XORing to compute the new parity. The new parity is computed in operation 308 by XORing the data for each non-parity member (which will now reside in memory, having been read, or generated deterministically and written, or supplied by the user and written). Note that one and only one of the writes can be bypassed due to the member being missing. In the example from above, the write of user data block 7 is bypassed. In operation 310, the parity is written. It along with the data for the other members not including disk drive C "captures" or "records" the data for user block 7 (which would reside on disk drive C). Finally, in operation 312 all the device FE bits in the sliver that were set are cleared. In the example from above, the device FE bit for user data block 1 would be cleared. This operation is necessary so that it is known that the sliver is consistent allowing data to be reconstructed (in the example above, reconstruction would be required for user data block 7).

While the invention has been particularly shown and described with reference to preferred embodiments thereof, it will be understood by those skilled in the art that various other changes in the form and details may be made therein without departing from the spirit and scope of the invention.

We claim:

1. A method for restoring consistency to data that are stored in data blocks of a RAID protected sliver in a RAID array, the data blocks in the sliver including a parity data block, the method comprising the steps of:

detecting inconsistent data in a particular one of the data blocks of the sliver;

determining whether valid data for the particular data block can be reconstructed from other data blocks of the sliver;

writing predetermined data to the particular data block to replace the inconsistent data when unable to reconstruct valid data from the other data blocks, wherein the predetermined data is different than valid data that is unable to be reconstructed;

marking the particular data block to indicate that the written predetermined data are consistent; and reconstructing the parity data block using the written predetermined data to restore redundancy to the sliver so that if another of the data blocks of the sliver subsequently has inconsistent data, then the predetermined data may be used to reconstruct valid data for that data block.

2. The method of claim 1 wherein the step of determining includes searching for inconsistent data in other data blocks of the sliver, and determines that valid data for the particular data block cannot be reconstructed from the other data when inconsistent data is detected in a second particular one of the data blocks of the sliver.

3. The method of claim 1 wherein the step of determining includes searching for inconsistent data in the other data blocks of the sliver, and determines that valid data for the particular data block cannot be reconstructed from the other data when a storage device is missing from the RAID array.

4. The method of claim 1 further comprising the step of:
   marking the particular data block of the sliver to indicate that the predetermined data is invalid data.

5. The method of claim 1 wherein the particular data block is a first particular data block and further comprising the steps of:
   initiating a write operation to write new data to a second particular one of the data blocks in the sliver; and
   writing the new data to the second particular data block after the predetermined data replaces the inconsistent data in the first particular data block in the sliver.

6. The method of claim 1 further comprising the steps of:
   detecting inconsistent data in a second particular one of the data blocks in the sliver; and
   reconstructing valid data for the second particular data block using the predetermined data.

7. The method of claim 1, wherein the predetermined data written to the particular data block depend on a type of that particular data block.

8. The method of claim 1, wherein the predetermined data written to the particular data block are unrelated to data that were previously stored in the particular data block.

* * * * *